United States Patent
Cohen et al.

(10) Patent No.: US 12,231,772 B2
(45) Date of Patent: *Feb. 18, 2025

(54) DUAL APERTURE ZOOM CAMERA WITH VIDEO SUPPORT AND SWITCHING/NON-SWITCHING DYNAMIC CONTROL

(71) Applicant: Corephotonics Ltd., Tel Aviv (IL)

(72) Inventors: Noy Cohen, Tel Aviv (IL); Oded Gigushinski, Tel Aviv (IL); Nadav Geva, Tel Aviv (IL); Gal Shabtay, Tel Aviv (IL); Ester Ashkenazi, Tel Aviv (IL); Ruthy Katz, Tel Aviv (IL); Ephraim Goldenberg, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,018

(22) Filed: May 27, 2024

(65) Prior Publication Data
US 2024/0314439 A1    Sep. 19, 2024

Related U.S. Application Data

(63) Continuation of application No. 18/449,724, filed on Aug. 15, 2023, now Pat. No. 12,022,196, which is a
(Continued)

(51) Int. Cl.
*H04N 23/69*     (2023.01)
*H04N 23/45*     (2023.01)
(Continued)

(52) U.S. Cl.
CPC ............. *H04N 23/69* (2023.01); *H04N 23/45* (2023.01); *H04N 23/62* (2023.01); *H04N 23/667* (2023.01)

(58) Field of Classification Search
CPC ........ H04N 23/69; H04N 23/45; H04N 23/62; H04N 23/667
See application file for complete search history.

(56) References Cited

U.S. PATENT DOCUMENTS

| 3,085,354 A | 4/1963 | Rasmussen et al. |
| 3,584,513 A | 6/1971 | Gates |

(Continued)

FOREIGN PATENT DOCUMENTS

| CN | 101276415 A | 10/2008 |
| CN | 201514511 U | 6/2010 |

(Continued)

OTHER PUBLICATIONS

Zitova Bet Al: "Image Registration Methods: A Survey", Image and Vision Computing, Elsevier, Guildford, GB, vol. 21, No. 11, Oct. 1, 2003 (Oct. 1, 2003), pp. 977-1000, XP00i 189327, ISSN: 0262-8856, DOI: 10_i016/ S0262-8856(03)00137-9.

(Continued)

*Primary Examiner* — Nhan T Tran
(74) *Attorney, Agent, or Firm* — Nathan & Associates; Menachem Nathan

(57) ABSTRACT

A dual-aperture zoom digital camera operable in both still and video modes. The camera includes Wide and Tele imaging sections with respective lens/sensor combinations and image signal processors and a camera controller operatively coupled to the Wide and Tele imaging sections. The Wide and Tele imaging sections provide respective image data. The controller is configured to output, in a zoom-in operation between a lower zoom factor (ZF) value and a higher ZF value, a zoom video output image that includes only Wide image data or only Tele image data, depending on whether a no-switching criterion is fulfilled or not.

20 Claims, 5 Drawing Sheets

Related U.S. Application Data continuation of application No. 18/064,369, filed on Dec. 12, 2022, now Pat. No. 11,770,616, which is a continuation of application No. 17/742,848, filed on May 12, 2022, now Pat. No. 11,546,518, which is a continuation of application No. 17/136,538, filed on Dec. 29, 2020, now Pat. No. 11,350,038, which is a continuation of application No. 16/704,266, filed on Dec. 5, 2019, now Pat. No. 10,917,576, which is a continuation of application No. 16/434,417, filed on Jun. 7, 2019, now Pat. No. 10,567,666, which is a continuation of application No. 16/241,505, filed on Jan. 7, 2019, now Pat. No. 10,356,332, which is a continuation of application No. 15/324,720, filed as application No. PCT/IB2016/053803 on Jun. 26, 2016, now Pat. No. 10,230,898.

(60) Provisional application No. 62/204,667, filed on Aug. 13, 2015.

(51) Int. Cl.
*H04N 23/62* (2023.01)
*H04N 23/667* (2023.01)

(56) References Cited

U.S. PATENT DOCUMENTS

| | | |
|---|---|---|
| 3,941,001 A | 3/1976 | LaSarge |
| 4,199,785 A | 4/1980 | McCullough et al. |
| 4,792,822 A | 12/1988 | Akiyama et al. |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,331,465 A | 7/1994 | Miyano |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,502,537 A | 3/1996 | Utagawa |
| 5,657,402 A | 8/1997 | Bender et al. |
| 5,682,198 A | 10/1997 | Katayama et al. |
| 5,768,443 A | 6/1998 | Michael et al. |
| 5,892,855 A | 4/1999 | Kakinami et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,201,533 B1 | 3/2001 | Rosenberg et al. |
| 6,208,765 B1 | 3/2001 | Bergen |
| 6,211,668 B1 | 4/2001 | Duesler et al. |
| 6,215,299 B1 | 4/2001 | Reynolds et al. |
| 6,222,359 B1 | 4/2001 | Duesler et al. |
| 6,268,611 B1 | 7/2001 | Pettersson et al. |
| 6,341,901 B1 | 1/2002 | Iwasa et al. |
| 6,520,643 B1 | 2/2003 | Holman et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,081,206 B2 * | 12/2011 | Martin ................ H04N 13/302 |
| | | 348/42 |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,752,969 B1 | 6/2014 | Kane et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,571,731 B2 * | 2/2017 | Shabtay ................ G03B 30/00 |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 10,230,898 B2 * | 3/2019 | Cohen ................ H04N 23/45 |
| 10,356,332 B2 * | 7/2019 | Cohen ................ H04N 23/69 |
| 10,567,666 B2 * | 2/2020 | Cohen ................ H04N 23/667 |
| 2002/0005902 A1 | 1/2002 | Yuen |

(56) References Cited

U.S. PATENT DOCUMENTS

| | | |
|---|---|---|
| 2002/0030163 A1 | 3/2002 | Zhang |
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0122113 A1 | 9/2002 | Foote |
| 2002/0136554 A1 | 9/2002 | Nomura et al. |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0156751 A1 | 8/2003 | Lee et al. |
| 2003/0160886 A1 | 8/2003 | Misawa et al. |
| 2003/0162564 A1 | 8/2003 | Kimura et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0189849 A1 | 9/2004 | Hofer et al. |
| 2004/0227838 A1 | 11/2004 | Atarashi et al. |
| 2004/0239313 A1 | 12/2004 | Godkin |
| 2004/0240052 A1 | 12/2004 | Minefuji et al. |
| 2005/0013509 A1 | 1/2005 | Samadani |
| 2005/0046740 A1 | 3/2005 | Davis |
| 2005/0134697 A1 | 6/2005 | Mikkonen et al. |
| 2005/0141390 A1 | 6/2005 | Lee et al. |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2005/0248667 A1 | 11/2005 | Schweng et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0126737 A1 | 6/2006 | Boice et al. |
| 2006/0170793 A1 | 8/2006 | Pasquarette et al. |
| 2006/0175549 A1 | 8/2006 | Miller et al. |
| 2006/0181619 A1 | 8/2006 | Liow et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0025713 A1* | 2/2007 | Hosono .................. H04N 23/55 348/E5.025 |
| 2007/0035631 A1 | 2/2007 | Ueda |
| 2007/0114990 A1 | 5/2007 | Godkin |
| 2007/0126911 A1 | 6/2007 | Nanjo |
| 2007/0127040 A1 | 6/2007 | Davidovici |
| 2007/0159344 A1 | 7/2007 | Kisacanin |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1* | 2/2008 | Border .................. H04N 23/45 348/E5.042 |
| 2008/0030611 A1 | 2/2008 | Jenkins |
| 2008/0084484 A1 | 4/2008 | Ochi et al. |
| 2008/0088942 A1 | 4/2008 | Seo |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0102948 A1 | 4/2009 | Scherling |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0168135 A1 | 7/2009 | Yu et al. |
| 2009/0190909 A1 | 7/2009 | Mise et al. |
| 2009/0200451 A1 | 8/2009 | Conners |
| 2009/0219547 A1 | 9/2009 | Kauhanen et al. |
| 2009/0234542 A1 | 9/2009 | Orlewski |
| 2009/0252484 A1 | 10/2009 | Hasuda et al. |
| 2009/0295949 A1 | 12/2009 | Ojala |
| 2009/0295986 A1 | 12/2009 | Topliss et al. |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0134621 A1 | 6/2010 | Namkoong et al. |
| 2010/0165131 A1 | 7/2010 | Makimoto et al. |
| 2010/0196001 A1 | 8/2010 | Ryynänen et al. |
| 2010/0202068 A1 | 8/2010 | Ito |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0265331 A1 | 10/2010 | Tanaka |
| 2010/0277619 A1* | 11/2010 | Scarff .................. H04N 23/45 348/240.1 |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0121666 A1 | 5/2011 | Park et al. |
| 2011/0128288 A1 | 6/2011 | Petrou et al. |
| 2011/0164172 A1 | 7/2011 | Shintani et al. |
| 2011/0221599 A1 | 9/2011 | Högasten |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0285714 A1 | 11/2011 | Swic et al. |
| 2011/0298966 A1 | 12/2011 | Kirschstein et al. |
| 2011/0310219 A1 | 12/2011 | Kim et al. |
| 2012/0014682 A1 | 1/2012 | David et al. |
| 2012/0026366 A1* | 2/2012 | Golan .................. H04N 5/2628 348/240.2 |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0098927 A1 | 4/2012 | Sablak et al. |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0148854 A1 | 6/2013 | Wang et al. |
| 2013/0155176 A1 | 6/2013 | Paripally et al. |
| 2013/0163085 A1 | 6/2013 | Lim et al. |
| 2013/0182150 A1 | 7/2013 | Asakura |

(56) References Cited

U.S. PATENT DOCUMENTS

| | | |
|---|---|---|
| 2013/0201360 A1 | 8/2013 | Song |
| 2013/0202273 A1 | 8/2013 | Ouedraogo et al. |
| 2013/0229544 A1 | 9/2013 | Bando |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0258048 A1 | 10/2013 | Wang et al. |
| 2013/0270419 A1 | 10/2013 | Singh et al. |
| 2013/0278785 A1 | 10/2013 | Nomura et al. |
| 2013/0286221 A1 | 10/2013 | Shechtman et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192224 A1 | 7/2014 | Laroia |
| 2014/0192238 A1 | 7/2014 | Attar et al. |
| 2014/0192253 A1 | 7/2014 | Laroia |
| 2014/0218587 A1 | 8/2014 | Shah |
| 2014/0253693 A1* | 9/2014 | Shikata ............ H04N 23/69 348/47 |
| 2014/0267834 A1* | 9/2014 | Aoki ............... H04N 23/69 348/240.1 |
| 2014/0313316 A1 | 10/2014 | Olsson et al. |
| 2014/0362242 A1 | 12/2014 | Takizawa |
| 2014/0376090 A1 | 12/2014 | Terajima |
| 2014/0379103 A1 | 12/2014 | Ishikawa et al. |
| 2015/0002683 A1 | 1/2015 | Hu et al. |
| 2015/0002684 A1 | 1/2015 | Kuchiki |
| 2015/0042870 A1 | 2/2015 | Chan et al. |
| 2015/0070781 A1 | 3/2015 | Cheng et al. |
| 2015/0086127 A1 | 3/2015 | Camilus et al. |
| 2015/0092066 A1 | 4/2015 | Geiss et al. |
| 2015/0103147 A1 | 4/2015 | Ho et al. |
| 2015/0110345 A1 | 4/2015 | Weichselbaum |
| 2015/0124059 A1 | 5/2015 | Georgiev et al. |
| 2015/0138381 A1 | 5/2015 | Ahn |
| 2015/0145965 A1 | 5/2015 | Livyatan et al. |
| 2015/0146030 A1* | 5/2015 | Venkataraman ...... H04N 23/45 348/218.1 |
| 2015/0154776 A1 | 6/2015 | Zhang et al. |
| 2015/0162048 A1 | 6/2015 | Hirata et al. |
| 2015/0181115 A1 | 6/2015 | Mashiah |
| 2015/0195458 A1 | 7/2015 | Nakayama et al. |
| 2015/0198464 A1 | 7/2015 | El Alami |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0288865 A1 | 10/2015 | Osborne |
| 2015/0296112 A1 | 10/2015 | Park et al. |
| 2015/0316744 A1 | 11/2015 | Chen |
| 2015/0334309 A1 | 11/2015 | Peng et al. |
| 2016/0028949 A1 | 1/2016 | Lee et al. |
| 2016/0044250 A1 | 2/2016 | Shabtay et al. |
| 2016/0050345 A1* | 2/2016 | Longbotham ...... H04N 13/239 348/47 |
| 2016/0070088 A1 | 3/2016 | Koguchi |
| 2016/0154066 A1 | 6/2016 | Hioka et al. |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0238834 A1 | 8/2016 | Erlich et al. |
| 2016/0241751 A1 | 8/2016 | Park |
| 2016/0241793 A1* | 8/2016 | Ravirala ............ H04N 23/635 |
| 2016/0245669 A1 | 8/2016 | Nomura |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0301868 A1 | 10/2016 | Acharya et al. |
| 2016/0342095 A1 | 11/2016 | Bieling et al. |
| 2016/0353008 A1 | 12/2016 | Osborne |
| 2016/0353012 A1 | 12/2016 | Kao et al. |
| 2016/0381289 A1 | 12/2016 | Kim et al. |
| 2017/0001577 A1 | 1/2017 | Seagraves et al. |
| 2017/0019616 A1 | 1/2017 | Zhu et al. |
| 2017/0070731 A1 | 3/2017 | Darling et al. |
| 2017/0085764 A1* | 3/2017 | Kim ................ H04N 23/63 |
| 2017/0094187 A1 | 3/2017 | Sharma et al. |
| 2017/0115466 A1 | 4/2017 | Murakami et al. |
| 2017/0124987 A1 | 5/2017 | Kim et al. |
| 2017/0150061 A1 | 5/2017 | Shabtay et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0219749 A1 | 8/2017 | Hou et al. |
| 2017/0242225 A1 | 8/2017 | Fiske |
| 2017/0276954 A1 | 9/2017 | Bajorins et al. |
| 2017/0289458 A1 | 10/2017 | Song et al. |
| 2017/0294002 A1 | 10/2017 | Jia et al. |
| 2017/0329111 A1 | 11/2017 | Hu et al. |
| 2018/0003925 A1 | 1/2018 | Shmunk |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0109660 A1 | 4/2018 | Yoon et al. |
| 2018/0109710 A1 | 4/2018 | Lee et al. |
| 2018/0120674 A1 | 5/2018 | Avivi et al. |
| 2018/0131923 A1* | 5/2018 | Chang ............... H04N 13/239 |
| 2018/0150973 A1 | 5/2018 | Tang et al. |
| 2018/0176426 A1 | 6/2018 | Wei et al. |
| 2018/0183982 A1 | 6/2018 | Lee et al. |
| 2018/0184010 A1 | 6/2018 | Cohen et al. |
| 2018/0198897 A1 | 7/2018 | Tang et al. |
| 2018/0216925 A1 | 8/2018 | Yasuda et al. |
| 2018/0241922 A1 | 8/2018 | Baldwin et al. |
| 2018/0249090 A1 | 8/2018 | Nakagawa et al. |
| 2018/0295292 A1 | 10/2018 | Lee et al. |
| 2018/0300901 A1 | 10/2018 | Wakai et al. |
| 2018/0307005 A1 | 10/2018 | Price et al. |
| 2018/0329281 A1 | 11/2018 | Ye |
| 2018/0368656 A1 | 12/2018 | Austin et al. |
| 2019/0089941 A1 | 3/2019 | Bigioi et al. |
| 2019/0096047 A1 | 3/2019 | Ogasawara |
| 2019/0100156 A1 | 4/2019 | Chung et al. |
| 2019/0121103 A1 | 4/2019 | Bachar et al. |
| 2019/0121216 A1 | 4/2019 | Shabtay et al. |
| 2019/0130822 A1 | 5/2019 | Jung et al. |
| 2019/0154466 A1 | 5/2019 | Fletcher |
| 2019/0213712 A1 | 7/2019 | Lashdan et al. |
| 2019/0215440 A1 | 7/2019 | Rivard et al. |
| 2019/0222758 A1 | 7/2019 | Goldenberg et al. |
| 2019/0227338 A1 | 7/2019 | Bachar et al. |
| 2019/0228562 A1 | 7/2019 | Song |
| 2019/0297238 A1 | 9/2019 | Klosterman |
| 2019/0320119 A1 | 10/2019 | Miyoshi |
| 2020/0014912 A1 | 1/2020 | Kytsun et al. |
| 2020/0092486 A1 | 3/2020 | Guo et al. |
| 2020/0103726 A1 | 4/2020 | Shabtay et al. |
| 2020/0104034 A1 | 4/2020 | Lee et al. |
| 2020/0118287 A1 | 4/2020 | Hsieh et al. |
| 2020/0134848 A1 | 4/2020 | El-Khamy et al. |
| 2020/0162682 A1 | 5/2020 | Cheng et al. |
| 2020/0221026 A1 | 7/2020 | Fridman et al. |
| 2020/0264403 A1 | 8/2020 | Bachar et al. |
| 2020/0389580 A1 | 12/2020 | Kodama et al. |
| 2021/0180989 A1 | 6/2021 | Fukumura et al. |
| 2021/0208415 A1 | 7/2021 | Goldenberg et al. |
| 2021/0333521 A9 | 10/2021 | Yedid et al. |
| 2021/0368104 A1 | 11/2021 | Bian et al. |
| 2022/0252963 A1 | 8/2022 | Shabtay et al. |
| 2022/0368814 A1 | 11/2022 | Topliss et al. |

(56) References Cited

U.S. PATENT DOCUMENTS

FOREIGN PATENT DOCUMENTS

| | | | |
|---|---|---|---|
| CN | 102130567 A | 7/2011 | |
| CN | 102215373 A | 10/2011 | |
| CN | 102739949 A | 10/2012 | |
| CN | 102982518 A | 3/2013 | |
| CN | 103024272 A | 4/2013 | |
| CN | 203406908 U | 1/2014 | |
| CN | 203482298 U | 3/2014 | |
| CN | 103841404 A | 6/2014 | |
| CN | 204422947 U | 6/2015 | |
| CN | 205301703 U | 6/2016 | |
| CN | 105827903 A | 8/2016 | |
| CN | 105847662 A | 8/2016 | |
| CN | 107608052 A | 1/2018 | |
| CN | 107682489 A | 2/2018 | |
| CN | 109729266 A | 5/2019 | |
| EP | 1536633 A1 | 6/2005 | |
| EP | 1780567 A1 | 5/2007 | |
| EP | 2523450 A1 | 11/2012 | |
| JP | S59191146 A | 10/1984 | |
| JP | 04211230 A | 8/1992 | |
| JP | H07318864 A | 12/1995 | |
| JP | 08271976 A | 10/1996 | |
| JP | 2002010276 A | 1/2002 | |
| JP | 2003298920 A | 10/2003 | |
| JP | 2003304024 A | 10/2003 | |
| JP | 2004056779 A | 2/2004 | |
| JP | 2004133054 A | 4/2004 | |
| JP | 2004245982 A | 9/2004 | |
| JP | 2005099265 A | 4/2005 | |
| JP | 2005122084 A | 5/2005 | |
| JP | 2005321592 A | 11/2005 | |
| JP | 2006038891 A | 2/2006 | |
| JP | 2006191411 A | 7/2006 | |
| JP | 2006237914 A | 9/2006 | |
| JP | 2006238325 A | 9/2006 | |
| JP | 2008083377 A | 9/2006 | |
| JP | 2007086808 A | 4/2007 | |
| JP | 2007228006 A | 9/2007 | |
| JP | 2007306282 A | 11/2007 | |
| JP | 2008076485 A | 4/2008 | |
| JP | 2008245142 A | 10/2008 | |
| JP | 2008271026 A | 11/2008 | |
| JP | 2010204341 A | 9/2010 | |
| JP | 2011055246 A | 3/2011 | |
| JP | 2011085666 A | 4/2011 | |
| JP | 2011138407 A | 7/2011 | |
| JP | 2011203283 A | 10/2011 | |
| JP | 2012132739 A | 7/2012 | |
| JP | 2013101213 A | 5/2013 | |
| JP | 2013106289 A | 5/2013 | |
| JP | 2016105577 A | 6/2016 | |
| JP | 2017146440 A | 8/2017 | |
| JP | 2019126179 A | 7/2019 | |
| KR | 20070005946 A | 1/2007 | |
| KR | 20090058229 A | 6/2009 | |
| KR | 20100008936 A | 1/2010 | |
| KR | 20110080590 A | 7/2011 | |
| KR | 20110082494 A | 7/2011 | |
| KR | 20130104764 A | 9/2013 | |
| KR | 1020130135805 A | 11/2013 | |
| KR | 20140014787 A | 2/2014 | |
| KR | 101428042 B1 | 8/2014 | |
| KR | 101477178 B1 | 12/2014 | |
| KR | 20140144126 A | 12/2014 | |
| KR | 20150118012 A | 10/2015 | |
| KR | 20170105236 A | 9/2017 | |
| KR | 20180120894 A | 11/2018 | |
| KR | 20130085116 A | 6/2019 | |
| TW | 1407177 B | 9/2013 | |
| WO | 2000027131 A2 | 5/2000 | |
| WO | 2004084542 A1 | 9/2004 | |
| WO | 2006008805 A1 | 1/2006 | |
| WO | 2010122841 A1 | 10/2010 | |
| WO | 2014072818 A2 | 5/2014 | |
| WO | WO-2014199338 A2 * | 12/2014 | ......... G02B 13/0015 |
| WO | 2017025822 A1 | 2/2017 | |
| WO | 2017037688 A1 | 3/2017 | |
| WO | 2018130898 A1 | 7/2018 | |

OTHER PUBLICATIONS

Statistical Modeling and Performance Characterization of a Real-Time Dual Camera Surveillance System, Greienhagen et al., Publisher: IEEE, 2000, 8 pages.

A 3MPixel Multi-Aperture Image Sensor with 0.7 µm Pixels in 0.11 µm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 2007, 9 pages.

Superimposed multi-resolution imaging, Carles et al., Publisher: Optical Society of America, 2017, 13 pages.

Viewfinder Alignment, Adams et al., Publisher: EUROGRAPHICS, 2008, 10 pages.

Dual-Camera System for Multi-Level Activity Recognition, Bodor et al., Publisher: IEEE, Oct. 2014, 6 pages.

Engineered to the task: Why camera-phone cameras are different, Giles Humpston, Publisher: Solid State Technology, Jun. 2009, 3 pages.

Zitova Bet Al: "Image Registration Methods: A Survey", Image and Vision Computing, Elsevier, Guildford, GB, vol. 21, No. 11, Oct. 1, 2003 (Oct. 1, 2003), pp. 977-1000, XP00i 189327, ISSN: 0262-8856, DOI: 10_i0i6/ S0262-8856(03)00137-9.

* cited by examiner

DUAL APERTURE ZOOM CAMERA WITH VIDEO SUPPORT AND SWITCHING/NON-SWITCHING DYNAMIC CONTROL

CROSS REFERENCE TO RELATED APPLICATIONS

This is a continuation of application Ser. No. 18/449,724 filed Aug. 15, 2023 (now allowed), which was a continuation of application Ser. No. 18/064,369 filed Dec. 12, 2022 (issued as U.S. Pat. No. 11,770,616), which was a continuation of application Ser. No. 17/742,848 filed May 12, 2022 (issued as U.S. Pat. No. 11,546,518), which was a continuation of application Ser. No. 17/136,538 filed Dec. 29, 2020 (issued as U.S. Pat. No. 11,350,038), which was a continuation of application Ser. No. 16/704,266 filed Dec. 5, 2019 (issued as U.S. Pat. No. 10,917,576), which was a continuation of application Ser. No. 16/434,417 filed Jun. 7, 2019 (issued as U.S. Pat. No. 10,567,666), which was a continuation of application Ser. No. 16/241,505 filed Jan. 7, 2019 (issued as U.S. Pat. No. 10,356,332), which was a continuation of application Ser. No. 15/324,720 filed Jan. 8, 2017 (issued as U.S. Pat. No. 10,230,898), which was a 371 application from international patent application PCT/IB2016/053803 filed Jun. 26, 2016, and is related to and claims priority from U.S. Provisional Patent Application No. 62/204,667 filed Aug. 13, 2015 which is expressly incorporated herein by reference in its entirety.

FIELD

Embodiments disclosed herein relate in general to digital cameras and in particular to zoom digital cameras with video capabilities.

BACKGROUND

Digital camera modules are currently being incorporated into a variety of host devices. Such host devices include cellular telephones, personal data assistants (PDAs), computers, and so forth. Consumer demand for digital camera modules in host devices continues to grow.

Host device manufacturers prefer digital camera modules to be small, so that they can be incorporated into the host device without increasing its overall size. Further, there is an increasing demand for such cameras to have higher-performance characteristics. One such characteristic possessed by many higher-performance cameras (e.g., standalone digital still cameras) is the ability to vary the focal length of the camera to increase and decrease the magnification of the image. This ability, typically accomplished with a zoom lens, is known as optical zooming. "Zoom" is commonly understood as a capability to provide different magnifications of the same scene and/or object by changing the focal length of an optical system, with a higher level of zoom associated with greater magnification and a lower level of zoom associated with lower magnification. Optical zooming is typically accomplished by mechanically moving lens elements relative to each other. Such zoom lenses are typically more expensive, larger and less reliable than fixed focal length lenses. An alternative approach for approximating the zoom effect is achieved with what is known as digital zooming. With digital zooming, instead of varying the focal length of the lens, a processor in the camera crops the image and interpolates between the pixels of the captured image to create a magnified but lower-resolution image.

Attempts to use multi-aperture imaging systems to approximate the effect of a zoom lens are known. A multi-aperture imaging system (implemented for example in a digital camera) includes a plurality of optical sub-systems (also referred to as "cameras"). Each camera includes one or more lenses and/or other optical elements which define an aperture such that received electro-magnetic radiation is imaged by the optical sub-system and a resulting image is directed towards a two-dimensional (2D) pixelated image sensor region. The image sensor (or simply "sensor") region is configured to receive the image and to generate a set of image data based on the image. The digital camera may be aligned to receive electromagnetic radiation associated with scenery having a given set of one or more objects. The set of image data may be represented as digital image data, as well known in the art. Hereinafter in this description, "image" "image data" and "digital image data" may be used interchangeably. Also, "object" and "scene" may be used interchangeably. As used herein, the term "object" is an entity in the real world imaged to a point or pixel in the image.

Multi-aperture imaging systems and associated methods are described for example in US Patent Publications No. 2008/0030592, 2010/0277619 and 2011/0064327. In US 2008/0030592, two sensors are operated simultaneously to capture an image imaged through an associated lens. A sensor and its associated lens form a lens/sensor combination. The two lenses have different focal lengths. Thus, even though each lens/sensor combination is aligned to look in the same direction, each combination captures an image of the same subject but with two different fields of view (FOV). One sensor is commonly called "Wide" and the other "Tele". Each sensor provides a separate image, referred to respectively as "Wide" (or "W") and "Tele" (or "T") images. A W-image reflects a wider FOV and has lower resolution than the T-image. The images are then stitched (fused) together to form a composite ("fused") image. In the composite image, the central portion is formed by the relatively higher-resolution image taken by the lens/sensor combination with the longer focal length, and the peripheral portion is formed by a peripheral portion of the relatively lower-resolution image taken by the lens/sensor combination with the shorter focal length. The user selects a desired amount of zoom and the composite image is used to interpolate values from the chosen amount of zoom to provide a respective zoom image. The solution offered by US 2008/0030592 requires, in video mode, very large processing resources in addition to high frame rate requirements and high power consumption (since both cameras are fully operational).

US 2010/0277619 teaches a camera with two lens/sensor combinations, the two lenses having different focal lengths, so that the image from one of the combinations has a FOV approximately 2-3 times greater than the image from the other combination. As a user of the camera requests a given amount of zoom, the zoomed image is provided from the lens/sensor combination having a FOV that is next larger than the requested FOV. Thus, if the requested FOV is less than the smaller FOV combination, the zoomed image is created from the image captured by that combination, using cropping and interpolation if necessary. Similarly, if the requested FOV is greater than the smaller FOV combination, the zoomed image is created from the image captured by the other combination, using cropping and interpolation if necessary. The solution offered by US 2010/0277619 leads to parallax artifacts when moving to the Tele camera in video mode.

In both US 2008/0030592 and US 2010/0277619, different focal length systems cause matching Tele and Wide FOVs to be exposed at different times using CMOS sensors. This degrades the overall image quality. Different optical F numbers ("F #") cause image intensity differences. Working with such a dual sensor system requires double bandwidth support, i.e. additional wires from the sensors to the following HW component. Neither US 2008/0030592 nor US 2010/0277619 deal with registration errors.

US 2011/0064327 discloses multi-aperture imaging systems and methods for image data fusion that include providing first and second sets of image data corresponding to an imaged first and second scene respectively. The scenes overlap at least partially in an overlap region, defining a first collection of overlap image data as part of the first set of image data, and a second collection of overlap image data as part of the second set of image data. The second collection of overlap image data is represented as a plurality of image data cameras such that each of the cameras is based on at least one characteristic of the second collection, and each camera spans the overlap region. A fused set of image data is produced by an image processor, by modifying the first collection of overlap image data based on at least a selected one of, but less than all of, the image data cameras. The systems and methods disclosed in this application deal solely with fused still images.

None of the known art references provide a thin (e.g. fitting in a cell-phone) dual-aperture zoom digital camera with fixed focal length lenses, the camera configured to operate in both still mode and video mode to provide still and video images, wherein the camera configuration does not use any fusion to provide a continuous, smooth zoom in video mode.

Therefore there is a need for, and it would be advantageous to have thin digital cameras with optical zoom operating in both video and still mode that do not suffer from commonly encountered problems and disadvantages, some of which are listed above.

SUMMARY

Embodiments disclosed herein teach the use of dual-aperture (also referred to as dual-lens or two-sensor) optical zoom digital cameras. The cameras include two cameras, a Wide camera and a Tele camera, each camera including a fixed focal length lens, an image sensor and an image signal processor (ISP). The Tele camera is the higher zoom camera and the Wide camera is the lower zoom camera. In some embodiments, the thickness/effective focal length (EFL) ratio of the Tele lens is smaller than about 1. The image sensor may include two separate 2D pixelated sensors or a single pixelated sensor divided into at least two areas. The digital camera can be operated in both still and video modes. In video mode, optical zoom is achieved "without fusion", by, in some embodiments, switching between the W and T images to shorten computational time requirements, thus enabling high video rate. To avoid discontinuities in video mode, the switching includes applying additional processing blocks, which include in some embodiments image scaling and shifting. In some embodiments, when a no-switching criterion is fulfilled, optical zoom is achieved in video mode without switching.

As used herein, the term "video" refers to any camera output that captures motion by a series of pictures (images), as opposed to "still mode" that friezes motion. Examples of "video" in cellphones and smartphones include "video mode" or "preview mode".

In order to reach optical zoom capabilities, a different magnification image of the same scene is captured (grabbed) by each camera, resulting in FOV overlap between the two cameras. Processing is applied on the two images to fuse and output one fused image in still mode. The fused image is processed according to a user zoom factor request. As part of the fusion procedure, up-sampling may be applied on one or both of the grabbed images to scale it to the image grabbed by the Tele camera or to a scale defined by the user. The fusion or up-sampling may be applied to only some of the pixels of a sensor. Down-sampling can be performed as well if the output resolution is smaller than the sensor resolution.

The cameras and associated methods disclosed herein address and correct many of the problems and disadvantages of known dual-aperture optical zoom digital cameras. They provide an overall zoom solution that refers to all aspects: optics, algorithmic processing and system hardware (HW).

In a dual-aperture camera image plane, as seen by each camera (and respective image sensor), a given object will be shifted and have different perspective (shape). This is referred to as point-of-view (POV). The system output image can have the shape and position of either camera image or the shape or position of a combination thereof. If the output image retains the Wide image shape then it has the Wide perspective POV. If it retains the Wide camera position then it has the Wide position POV. The same applies for Tele images position and perspective. As used in this description, the perspective POV may be of the Wide or Tele cameras, while the position POV may shift continuously between the Wide and Tele cameras. In fused images, it is possible to register Tele image pixels to a matching pixel set within the Wide image pixels, in which case the output image will retain the Wide POV ("Wide fusion"). Alternatively, it is possible to register Wide image pixels to a matching pixel set within the Tele image pixels, in which case the output image will retain the Tele POV ("Tele fusion"). It is also possible to perform the registration after either camera image is shifted, in which case the output image will retain the respective Wide or Tele perspective POV.

In an exemplary embodiment, there is provided a zoom digital camera comprising a Wide imaging section that includes a fixed focal length Wide lens with a Wide FOV and a Wide sensor, the Wide imaging section operative to provide Wide image data of an object or scene, a Tele imaging section that includes a fixed focal length Tele lens with a Tele FOV that is narrower than the Wide FOV and a Tele sensor, the Tele imaging section operative to provide Tele image data of the object or scene, and a camera controller operatively coupled to the Wide and Tele imaging sections, the camera controller configured to evaluate a no-switching criterion determined by inputs from both Wide and Tele image data, and, if the no-switching criterion is fulfilled, to output a zoom video output image that includes only Wide image data in a zoom-in operation between a lower zoom factor (ZF) value and a higher ZF value.

In an exemplary embodiment there is provided a method for obtaining zoom images of an object or scene using a digital camera, comprising the steps of providing in the digital camera a Wide imaging section having a Wide lens with a Wide FOV and a Wide sensor, a Tele imaging section having a Tele lens with a Tele FOV that is narrower than the Wide FOV and a Tele sensor, and a camera controller operatively coupled to the Wide and Tele imaging sections, and configuring the camera controller to evaluate a no-switching criterion determined by inputs from both Wide and Tele image data, and, if the no-switching criterion is fulfilled, to output a zoom video output image that includes only Wide image data in a zoom-in operation between a lower ZF value and a higher ZF value.

In some exemplary embodiments, the no-switching criterion includes a shift between the Wide and Tele images calculated by global registration, the shift being greater than a first threshold.

In some exemplary embodiments, the no-switching criterion includes a disparity range calculated by global registration, the disparity range being greater than a second threshold.

In some exemplary embodiments, the no-switching criterion includes an effective resolution of the Tele image being lower than an effective resolution of the Wide image.

In some exemplary embodiments, the no-switching criterion includes a number of corresponding features in the Wide and Tele images being smaller than a third threshold.

In some exemplary embodiments, the no-switching criterion includes a majority of objects imaged in an overlap area of the Wide and Tele images being calculated to be closer to the camera than a first threshold distance.

In some exemplary embodiments, the no-switching criterion includes some objects imaged in an overlap area of the Wide and Tele images being calculated to be closer than a second threshold distance while other objects imaged in the overlap area of the Wide and Tele images being calculated to be farther than a third distance threshold.

In some exemplary embodiments, the camera controller includes a user control module for receiving user inputs and a sensor control module for configuring each sensor to acquire the Wide and Tele image data based on the user inputs.

In some exemplary embodiments, the user inputs include a zoom factor, a camera mode and a region of interest.

In some exemplary embodiments, the Tele lens includes a ratio of total track length (TTL)/effective focal length (EFL) smaller than 1. For a definition of TTL and EFL see e.g. co-assigned US published patent application Ser. No. 20150244942.

In some exemplary embodiments, if the no-switching criterion is not fulfilled, the camera controller is further configured to output video output images with a smooth transition when switching between the lower ZF value and the higher ZF value or vice versa, wherein at the lower ZF value the output image is determined by the Wide sensor, and wherein at the higher ZF value the output image is determined by the Tele sensor.

In some exemplary embodiments, the camera controller is further configured to combine in still mode, at a predefined range of ZF values, at least some of the Wide and Tele image data to provide a fused output image of the object or scene from a particular point of view.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. The drawings and descriptions are meant to illuminate and clarify embodiments disclosed herein, and should not be considered limiting in any way.

DETAILED DESCRIPTION

Definitions

Sharpness score: the gradients (dx, dy) of the image are compared (through subtraction) to the gradients of its low pass filtered version. A higher difference indicates a sharper original image. The result of this comparison is normalized with respect to the average variations (for example, sum of absolute gradients) of the original image, to obtain an absolute sharpness score.

Edge score: for each image, the edges are found (for example, using Canny edge detection) and the average intensity of gradients along them is calculated, for example, by calculating the magnitude of gradients (dx, dy) for each edge pixel, summing the results and dividing by the total number of edge pixels. The result is the edge score.

Effective resolution score: this score is calculated only in a region of interest (ROI) and provides a good indication of the effective resolution level in the image. As used herein, "ROI" is a user-defined sub-region of the image that may be exemplarily 4% or less of the image area. The effective resolution score can be derived from a combination of the sharpness scores and edge scores for each image, for example by normalizing both to be between [0, 1] and by taking their average.

Figure 1A:
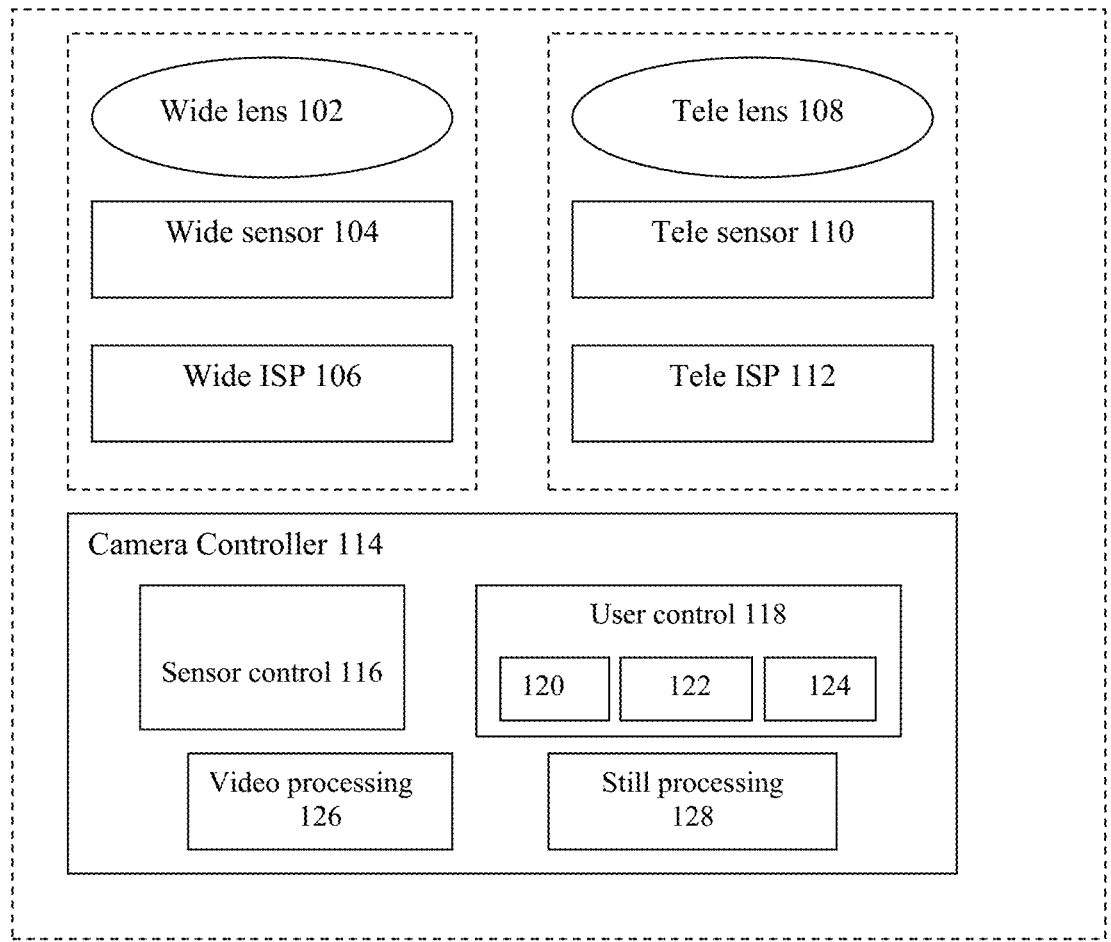
FIG. 1A shows schematically a block diagram illustrating an exemplary dual-aperture zoom imaging system disclosed herein.

FIG. 1A shows schematically a block diagram illustrating an exemplary embodiment of a dual-aperture zoom imaging system (also referred to simply as "dual-camera" or "dual-aperture camera") disclosed herein and numbered 100. Dual-aperture camera 100 comprises a Wide imaging section ("Wide camera") that includes a Wide lens block 102, a Wide image sensor 104 and a Wide image processor 106. Dual-aperture camera 100 further comprises a Tele imaging section ("Tele camera") that includes a Tele lens block 108, a Tele image sensor 110 and a Tele image processor 112. The image sensors may be physically separate or may be part of a single larger image sensor. The Wide sensor pixel size can be equal to or different from the Tele sensor pixel size. Dual-aperture camera 100 further comprises a camera fusion processing core (also referred to as "controller") 114 that includes a sensor control module 116, a user control module 118, a video processing module 126 and a capture processing module 128, all operationally coupled to sensor control block 110. User control module 118 comprises an operational mode function 120, a ROI function 122 and a zoom factor (ZF) function 124.

Sensor control module 116 is connected to the two (Wide and Tele) cameras and to the user control module 118 and used to choose, according to the zoom factor, which of the sensors is operational and to control the exposure mechanism and the sensor readout. Mode choice function 120 is used for choosing capture/video modes. ROI function 122 is used to choose a region of interest. The ROI is the region on which both cameras are focused on. Zoom factor function 124 is used to choose a zoom factor. Video processing module 126 is connected to mode choice function 120 and used for video processing. It is configurable to evaluate a no-switching criterion determined by inputs from both Wide and Tele image data and to make a decision regarding video output. Specifically, upon evaluation of a no-switching criterion, if the no-switching criterion is fulfilled, module 126 is configurable to output a zoom video output image that includes only Wide image data in a zoom-in operation between a lower zoom factor (ZF) value and a higher ZF value. If the no-switching criterion is not fulfilled, module 126 is configurable to combine in still mode, at a predefined range of ZF values, at least some of the Wide and Tele image data to provide a fused output image of the object or scene from a particular point of view. Still processing module 128 is connected to the mode choice function 120 and used for high image quality still mode images. The video processing module is applied when the user desires to shoot in video mode. The capture processing module is applied when the user wishes to shoot still pictures.

Figure 1B:
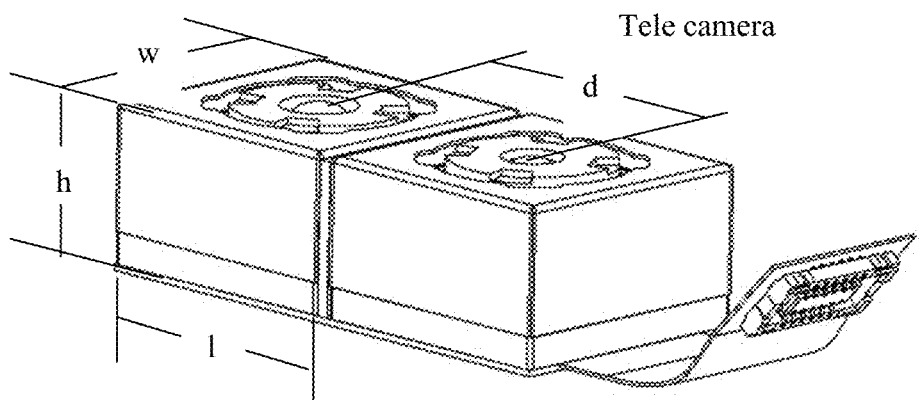
FIG. 1B is a schematic mechanical diagram of the dual-aperture zoom imaging system of FIG. 1A.

FIG. 1B is a schematic mechanical diagram of the dual-aperture zoom imaging system of FIG. 1A. Exemplary dimensions: Wide lens TTL=4.2 mm and EFL=3.5 mm; Tele lens TTL=6 mm and EFL=7 mm; both Wide and Tele sensors ⅓ inch; external dimensions of Wide and Tele cameras: width (w) and length (l)=8.5 mm and height (h)=6.8 mm; distance "d" between camera centers=10 mm.

Following is a detailed description and examples of different methods of use of dual-aperture camera 100.

Still Mode Operation/Function

Figure 2:
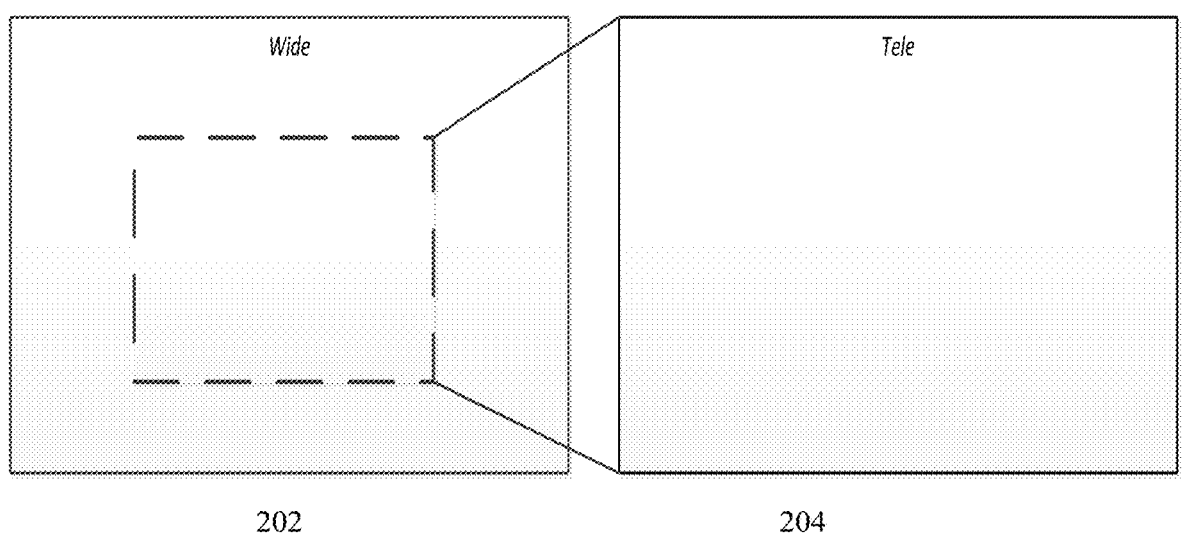
FIG. 2 shows an example of a Wide sensor, a Tele sensor and their respective FOVs.

In still camera mode, the obtained image is fused from information obtained by both cameras at all zoom levels, see FIG. 2, which shows a Wide sensor 202 and a Tele sensor 204 and their respective FOVs. Exemplarily, as shown, the Tele sensor FOV is half the Wide sensor FOV. The still camera mode processing includes two stages: the first stage includes setting HW settings and configuration, where a first objective is to control the sensors in such a way that matching FOVs in both images (Tele and Wide) are scanned at the same time, a second objective is to control the relative exposures according to the lens properties, and a third objective is to minimize the required bandwidth from both sensors for the ISPs. The second stage includes image processing that fuses the Wide and the Tele images to achieve optical zoom, improves SNR and provides wide dynamic range.

Figure 3A:
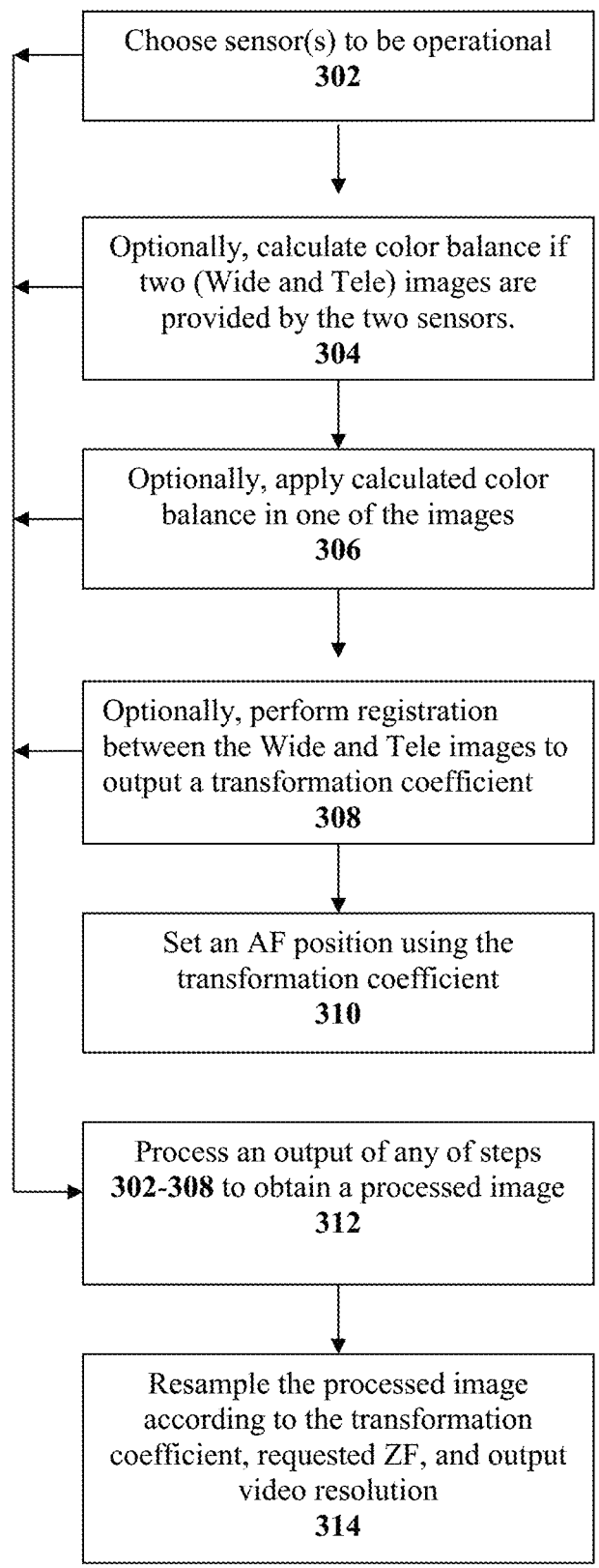
FIG. 3A shows an embodiment of an exemplary method disclosed herein for acquiring a zoom image in video/preview mode.

FIG. 3A shows image line numbers vs. time for an image section captured by CMOS sensors. A fused image is obtained by line (row) scans of each image. To prevent matching FOVs in both sensors to be scanned at different times, a particular configuration is applied by the camera controller on both image sensors while keeping the same frame rate. The difference in FOV between the sensors determines the relationship between the rolling shutter time and the vertical blanking time for each sensor.

Video Mode Operation/Function

Smooth Transition

When a dual-aperture camera switches the camera output between cameras or points of view, a user will normally see a "jump" (discontinuous) image change. However, a change in the zoom factor for the same camera and POV is viewed as a continuous change. A "smooth transition" (ST) is a transition between cameras or POVs that minimizes the jump effect. This may include matching the position, scale, brightness and color of the output image before and after the transition. However, an entire image position matching between the camera outputs is in many cases impossible, because parallax causes the position shift to be dependent on the object distance. Therefore, in a smooth transition as disclosed herein, the position matching is achieved only in the ROI region while scale brightness and color are matched for the entire output image area.

Zoom-In and Zoom-Out in Video Mode

In video mode, sensor oversampling is used to enable continuous and smooth zoom experience. Processing is applied to eliminate the changes in the image during cross-over from one camera to the other. Zoom from 1 to $Z_{switch}$ is performed using the Wide sensor only. From $Z_{switch}$ and on, it is performed mainly by the Tele sensor. To prevent "jumps" (roughness in the image), switching to the Tele image is done using a zoom factor which is a bit higher ($Z_{switch}+\Delta$Zoom) than $Z_{switch}$. $\Delta$Zoom is determined according to the system's properties and is different for cases where zoom-in is applied and cases where zoom-out is applied ($\Delta$Zoom$_{in}\neq\Delta$Zoom$_{out}$). This is done to prevent residual jumps artifacts to be visible at a certain zoom factor. The switching between sensors, for an increasing zoom and for decreasing zoom, is done on a different zoom factor.

The zoom video mode operation includes two stages: (1) sensor control and configuration and (2) image processing. In the range from 1 to $Z_{switch}$, only the Wide sensor is operational, hence, power can be supplied only to this sensor. Similar conditions hold for a Wide AF mechanism. From $Z_{switch}+\Delta$Zoom to $Z_{max}$ only the Tele sensor is operational, hence, power is supplied only to this sensor. Similarly, only the Tele sensor is operational and power is supplied only to it for a Tele AF mechanism. Another option is that the Tele sensor is operational and the Wide sensor is working in low frame rate. From $Z_{switch}$ to $Z_{switch}+\Delta$Zoom, both sensors are operational.

Zoom-in: at low ZF up to slightly above $ZF_T$ (the zoom factor that enables switching between Wide and Tele outputs) the output image is the digitally zoomed, unchanged Wide camera output. $ZF_T$ is defined as follows:

$$ZF_T = \text{Tan}(FOV_{Wide})/\text{Tan}(FOV_{Tele})$$

where Tan refers to "tangent", while $FOV_{Wide}$ and $FOV_{Tele}$ refer respectively to the Wide and Tele lens fields of view (in degrees). As used herein, the FOV is measured from the center axis to the corner of the sensor (i.e. half the angle of the normal definition). Switching cannot take place below $ZF_T$ and it can above it.

Figure 3B:
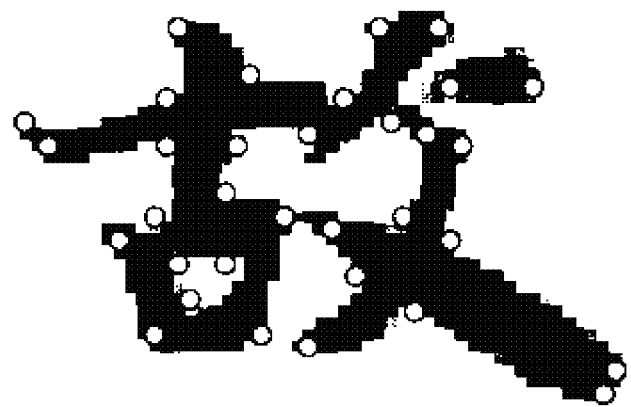
FIG. 3B shows exemplary feature points in an object.

In some embodiments for the up-transfer ZF, as disclosed in co-invented and co-owned U.S. Pat. No. 9,185,291, the output is a transformed Tele camera output, where the transformation is performed by a global registration (GR) algorithm to achieve smooth transition. As used herein "global registration" refers to an action for which the inputs are the Wide and Tele images. The Wide image is cropped to display the same FOV as the Tele image. The Tele image is passed through a low pass filter (LPF) and resized to make its appearance as close as possible to the Wide image (lower resolution and same pixel count). The outputs of GR are corresponding feature point pairs in the images along with their disparities, and parameters for differences between the images, i.e. shift and scale. As used herein, "feature point"

refers to a point such as points 10a-d in FIG. 3B and refers to a point (pixel) of interest on an object in an image. For purposes set forth in this description, a feature point should be reproducible and invariant to changes in image scale, noise and illumination. Such points usually lie on corners or other high-contrast regions of the object.

Stages of Global Registration

In some exemplary embodiments, global registration may be performed as follows:
1. Find interest points (features) in each image separately by filtering it with, exemplarily, a Difference of Gaussians filter, and finding local extrema on the resulting image.
2. Find feature correspondences (features in both images that describe the same point in space) in a "matching" process. These are also referred to as "feature pairs", "correspondence pairs" or "matching pairs". This is done by comparing each feature point from one (Tele or Wide) image (referred to hereinafter as "image 1") to all feature points in that region from the other (respectively Wide or Tele) image (referred to hereinafter as "image 2"). The features are compared only within their group of minima/maxima, using patch normalized cross-correlation. As used herein, "patch" refers to a group of neighboring pixels around an origin pixel.
3. The normalized cross correlation of two image patches $t(x, y)$ and $f(x, y)$ is $$\frac{1}{n}\sum_{x,y} \frac{(f(x, y) - \overline{f})(t(x, y) - \overline{t})}{\sigma_f \sigma_t}$$

where n is the number of pixels in both patches, $\overline{f}$ is the average of $f$ and $\sigma_f$ is the standard deviation of $f$. A match for a feature point from image 1 is only confirmed if its correlation score is much higher (for example, x1.2) than the next-best matching feature from image 2.

Figure 3C:
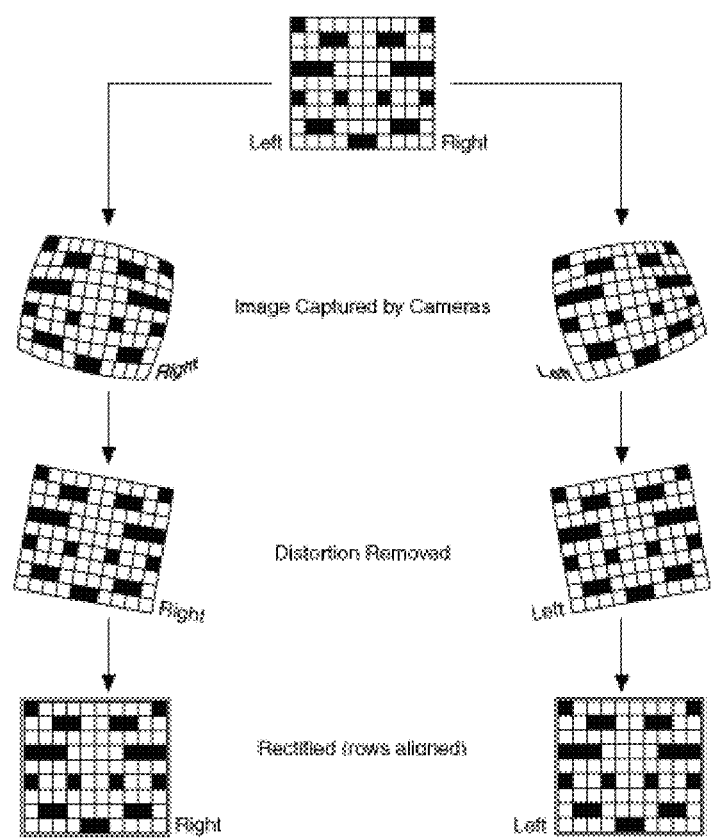
FIG. 3C shows schematically a known rectification process.

4. Find the disparity between each pair of corresponding features (also referred to as "matching pair") by subtracting their x and y coordinate values.
5. Filter bad matching points:
   a. Following the matching process, matches that include feature points from image 2 that were matched to more than one feature from image 1 are discarded.
   b. Matching pairs whose disparity is inconsistent with the other matching pairs are discarded. For example, if there is one corresponding pair which whose disparity is lower or higher than the others by 20 pixels.
6. The localization accuracy for matched points from image 2 is refined by calculating a correlation of neighboring pixel patches from image 2 with the target patch (the patch around the current pixel (of the current matching pair) from image 1, modeling the results as a parabola and finding its maximum.
7. Rotation and fine scale differences are calculated between the two images according to the matching points (for example, by subtracting the center of mass from each set of points, i.e. the part of the matching points belonging to either the Wide or the Tele image, and solving a least squares problem).
8. After compensating for these differences, since the images were rectified, the disparity in the Y axis should be close to 0. Matching points that do not fit this criterion are discarded. A known rectification process is illustrated in FIG. 3C.
9. Finally, the remaining matching points are considered true and the disparities for them are calculated. A weighted average of the disparity is taken as the shift between both images. The maximum difference between disparity values is taken as the disparity range.
10. At various stages during GR, if there are not enough feature/matching points remaining, the GR is stopped and returns a failure flag.

In addition, it is possible to find range calibration to the rectification process by finding the shiftI=shift for objects at infinity and defining shiftD=shift-shiftI and disparity D=disparity-shiftI. We then calculate $$\text{object distance} = \frac{focalLength \cdot baseline}{disparityD \cdot pixelSize},$$

where "baseline" is the distance between cameras.

Returning now to the Zoom-in process, in some embodiments, for higher ZF than the up-transfer ZF the output is the transformed Tele camera output, digitally zoomed. However, in other embodiments for higher ZF than the up-transfer ZF there will be no switching from the Wide to the Tele camera output, i.e. the output will be from the Wide camera, digitally zoomed. This "no switching" process is described next.

No Switching

Switching from the Wide camera output to the transformed Tele camera output will be performed unless some special condition (criterion), determined based on inputs obtained from the two camera images, occurs. In other words, switching will not be performed only if at least one of the following no-switching criteria is fulfilled:
1. if the shift calculated by GR is greater than a first threshold, for example 50 pixels.
2. if the disparity range calculated by GR is greater than a second threshold, for example 20 pixels, because in this case there is no global shift correction that will suppress movement/jump for all objects distances (smooth transition is impossible for all objects).
3. if the effective resolution score of the Tele image is lower than that of the Wide image. In this case, there is no point in performing the transition because no value (i.e. resolution) is gained. Smooth transition is possible but undesirable.
4. if the GR fails, i.e. if the number of matching pairs found is less than a third threshold, for example 20 matching pairs.
5. if, for example, that are imaged onto the overlap area are calculated to be closer than a first threshold distance, for example 30 cm, because this can result in a large image shift to obtain ST.
6. if some objects (for example two objects) that are imaged in the overlap area are calculated to be closer than a second threshold distance, for example 50 cm, while other objects (for example two objects) are calculated to be farther than a third threshold distance for example 10 m. The reason is that the shift between an object position in the Wide and Tele cameras is object distance dependent, where the closer the objects the larger the shift, so an image containing significantly close and far objects cannot be matched by simple transformation (shift scale) to be similar and thus provide ST between cameras.

Zoom-out: at high ZF down to slightly below $Z_{FT}$, the output image is the digitally zoomed transformed Tele camera output. For the down-transfer ZF, the output is a shifted Wide camera output, where the Wide shift correction is performed by the GR algorithm to achieve smooth transition, i.e. with no jump in the ROI region. For lower (than the down-transfer) ZF, the output is basically the down-transfer ZF output digitally zoomed but with gradually smaller Wide shift correction, until for ZF=1 the output is the unchanged Wide camera output.

Note that if a no-switching criterion is not fulfilled, then the camera will output without fusion continuous zoom video mode output images of the object or scene, each output image having a respective output resolution, the video output images being provided with a smooth transition when switching between the lower ZF value and the higher ZF value or vice versa, wherein at the lower ZF value the output resolution is determined by the Wide sensor, and wherein at the higher ZF value the output resolution is determined by the Tele sensor.

Figure 4:
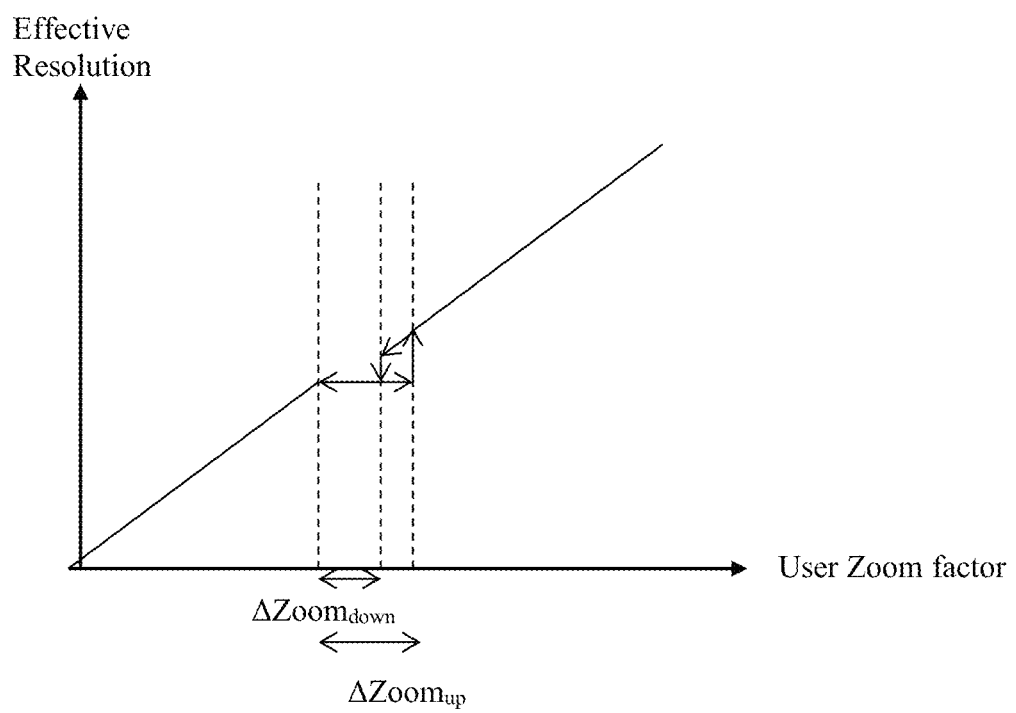
FIG. 4 shows a graph illustrating an effective resolution zoom factor.

FIG. 3A shows an embodiment of a method disclosed herein for acquiring a zoom image in video/preview mode for 3 different zoom factor (ZF) ranges: (a) ZF range=1: $Z_{switch}$; (b) ZF range=$Z_{switch}$: $Z_{switch}$+$\Delta$Zoom$_{in}$; and (c) Zoom factor range=$Z_{switch}$+$\Delta$Zoom$_{in}$: $Z_{max}$. The description is with reference to a graph of effective resolution vs. zoom factor (FIG. 4). In step 302, sensor control module 116 chooses (directs) the sensor (Wide, Tele or both) to be operational. Specifically, if the ZF range=1: $Z_{switch}$, module 116 directs the Wide sensor to be operational and the Tele sensor to be non-operational. If the ZF range is $Z_{switch}$: $Z_{switch}$+$\Delta$Zoom$_{in}$, module 116 directs both sensors to be operational and the zoom image is generated from the Wide sensor. If the ZF range is $Z_{switch}$+$\Delta$Zoom$_{in}$: $Z_{max}$, module 116 directs the Wide sensor to be non-operational and the Tele sensor to be operational. After the sensor choice in step 302, all following actions are performed in video processing core 126. Optionally, in step 304, color balance is calculated if two images are provided by the two sensors. Optionally yet, in step 306, the calculated color balance is applied in one of the images (depending on the zoom factor). Further optionally, in step 308, registration is performed between the Wide and Tele images to output a transformation coefficient. The transformation coefficient can be used to set an AF position in step 310. In step 312, an output of any of steps 302-308 is applied on one of the images (depending on the zoom factor) for image signal processing that may include denoising, demosaicing, sharpening, scaling, etc. In step 314, the processed image is resampled according to the transformation coefficient, the requested ZF (obtained from zoom function 124) and the output video resolution (for example 1080p). To avoid a transition point to be executed at the same ZF, $\Delta$Zoom can change while zooming in and while zooming out. This will result in hysteresis in the sensor switching point.

In more detail, for ZF range 1: $Z_{switch}$, for ZF<$Z_{switch}$, the Wide image data is transferred to the ISP in step 312 and resampled in step 314. For ZF range=$Z_{switch}$: $Z_{switch}$+$\Delta$Zoom$_{in}$, both sensors are operational and the zoom image is generated from the Wide sensor. The color balance is calculated for both images according to a given ROI. In addition, for a given ROI, registration is performed between the Wide and Tele images to output a transformation coefficient. The transformation coefficient is used to set an AF position. The transformation coefficient includes the translation between matching points in the two images. This translation can be measured in a number of pixels. Different translations will result in a different number of pixel movements between matching points in the images. This movement can be translated into depth and the depth can be translated into an AF position. This enables to set the AF position by only analyzing two images (Wide and Tele). The result is fast focusing.

Both color balance ratios and transformation coefficient are used in the ISP step. In parallel, the Wide image is processed to provide a processed image, followed by resampling. For ZF range=$Z_{switch}$+$\Delta$Zoom$_{in}$: $Z_{max}$ and for Zoom factor>$Z_{switch}$+$\Delta$Zoom$_{in}$, the color balance calculated previously is now applied on the Tele image. The Tele image data is transferred to the ISP in step 312 and resampled in step 314. To eliminate crossover artifacts and to enable smooth transition to the Tele image, the processed Tele image is resampled according to the transformation coefficient, the requested ZF (obtained from zoom function 124) and the output video resolution (for example 1080p).

FIG. 4 shows the effective resolution as a function of the zoom factor for a zoom-in case and for a zoom-out case. $\Delta$Zoom$_{up}$ is set when one zooms in, and $\Delta$Zoom$_{down}$ is set when one zooms out. Setting $\Delta$Zoom$_{up}$ to be different from $\Delta$Zoom$_{down}$ will result in transition between the sensors to be performed at different zoom factor ("hysteresis") when zoom-in is used and when zoom-out is used. This hysteresis phenomenon in the video mode results in smooth continuous zoom experience.

In conclusion, dual aperture optical zoom digital cameras and associate methods disclosed herein reduce the amount of processing resources, lower frame rate requirements, reduce power consumption, remove parallax artifacts and provide continuous focus (or provide loss of focus) when changing from Wide to Tele in video mode. They provide a dramatic reduction of the disparity range and avoid false registration in capture mode. They reduce image intensity differences and enable work with a single sensor bandwidth instead of two, as in known cameras.

All patent applications mentioned in this specification are herein incorporated in their entirety by reference into the specification, to the same extent as if each individual patent application was specifically and individually indicated to be incorporated herein by reference. In addition, citation or identification of any reference in this application shall not be construed as an admission that such reference is available as prior art to the present disclosure.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A zoom digital camera, comprising:
   a Wide imaging section that includes a fixed focal length Wide lens with a Wide field of view (FOV) and a Wide sensor, the Wide imaging section operative to provide Wide image data of an object;
   a Tele imaging section that includes a fixed focal length Tele lens with a Tele FOV that is narrower than the Wide FOV and a Tele sensor, the Tele imaging section operative to provide Tele image data of the object; and
   a camera controller operatively coupled to the Wide and Tele imaging sections, wherein the camera controller is configured to receive Wide image data and Tele image data and to use the Wide image data and Tele image data to calculate a parallax between the Wide imaging section and the Tele imaging section that causes a position shift between the Wide image data and Tele image data to be dependent on a distance of the object from the zoom digital camera, wherein the distance is calculated based on a feature disparity determined during a global registration, and wherein the camera controller is further configured to use the parallax calculation to provide focus for the Wide imaging section and/or for the Tele imaging section.

2. The zoom digital camera of claim 1, wherein the camera controller includes a user control module for receiving user inputs and a sensor control module for configuring each sensor to acquire the Wide and Tele image data based on the user inputs.

3. The zoom digital camera of claim 1, wherein the user inputs include a zoom factor, a camera mode and a region of interest.

4. The zoom digital camera of claim 1, wherein the Tele lens includes a ratio of total track length (TTL)/effective focal length (EFL) smaller than 1.

5. The zoom digital camera of claim 1, wherein the camera controller is further configured to combine in still mode, at a predefined range of ZF values, at least some of the Wide and Tele image data to provide a fused output image of the object or scene from a particular point of view.

6. The zoom digital camera of claim 1, wherein the camera controller operatively coupled to the Wide and Tele imaging sections and configured to evaluate if a no-switching criterion is fulfilled or not fulfilled.

7. The zoom digital camera of claim 6, wherein if the no-switching criterion is fulfilled in a zoom-in operation between a lower zoom factor (ZF) value and a higher ZF value at a zoom factor (ZF) higher than an up-transfer ZF, the camera controller is further configured to output a zoom video output image that includes only Wide image data.

8. The zoom digital camera of claim 1, wherein if the no-switching criterion is not fulfilled, the camera controller is further configured to output a zoom video output image that includes only transformed, digitally zoomed Tele image data.

9. The zoom digital camera of claim 1, wherein the zoom digital camera is operated in a preview mode.

10. The zoom digital camera of claim 1, wherein the zoom digital camera is operated in a still mode.

11. A method, comprising:
providing a zoom digital camera that includes a Wide imaging section that includes a fixed focal length Wide lens with a Wide field of view (FOV) and a Wide sensor, the Wide imaging section operative to provide Wide image data of an object, a Tele imaging section that includes a fixed focal length Tele lens with a Tele FOV that is narrower than the Wide FOV and a Tele sensor, the Tele imaging section operative to provide Tele image data of the object, and a camera controller operatively coupled to the Wide and Tele imaging sections;

configuring the camera controller to receive Wide image data and Tele image data and to use the Wide image data and Tele image data to calculate a parallax between the Wide imaging section and the Tele imaging section that causes a position shift between the Wide image data and Tele image data to be dependent on a distance of the object from the zoom digital camera, wherein the distance is calculated based on a feature disparity determined during a global registration; and configuring the camera controller to use the parallax calculation to provide focus for the Wide imaging section and/or for the Tele imaging section.

12. The method of claim 11, wherein the camera controller includes a user control module for receiving user inputs and a sensor control module for configuring each sensor to acquire the Wide and Tele image data based on the user inputs.

13. The method of claim 11, wherein the user inputs include a zoom factor, a camera mode and a region of interest.

14. The method of claim 11, wherein the Tele lens includes a ratio of total track length (TTL)/effective focal length (EFL) smaller than 1.

15. The method of claim 11, further comprising configuring the camera controller to combine in still mode, at a predefined range of ZF values, at least some of the Wide and Tele image data to provide a fused output image of the object or scene from a particular point of view.

16. The method of claim 11, further comprising configuring the camera controller to evaluate if a no-switching criterion is fulfilled or not fulfilled.

17. The method of claim 16, further comprising, if the no-switching criterion is fulfilled in a zoom-in operation between a lower zoom factor (ZF) value and a higher ZF value at a zoom factor (ZF) higher than an up-transfer ZF, configuring the camera controller to output a zoom video output image that includes only Wide image data.

18. The method of claim 16, further comprising, if the no-switching criterion is not fulfilled, configuring the camera controller to output a zoom video output image that includes only transformed, digitally zoomed Tele image data.

19. The method of claim 11, further comprising operating the zoom digital camera in a preview mode.

20. The method of claim 11, further comprising operating the zoom digital camera in a still mode.

* * * * *